United States Patent [19]

Nozawa et al.

[11] Patent Number: 4,698,904

[45] Date of Patent: Oct. 13, 1987

[54] APPARATUS FOR ASSEMBLING FINS AND TUBES FOR HEAT EXCHANGERS

[75] Inventors: Yoshio Nozawa; Izumi Ochiai, both of Tochigi; Yukio Kitayama, Oyama; Masahiro Miyagi, Tochigi; Katsuharu Uehara, Tochigi; Takahiko Deguchi, Tochigi; Keikichi Morita, Tochigi; Katsuo Arai, Tochigi; Tamotsu Nakayama, Sano, all of Japan

[73] Assignee: Hitachi, Ltd., Tokyo, Japan

[21] Appl. No.: 898,213

[22] Filed: Aug. 20, 1986

[30] Foreign Application Priority Data

Sep. 13, 1985 [JP] Japan .................................. 60-201501
Sep. 13, 1985 [JP] Japan .................................. 60-201502

[51] Int. Cl.$^4$ ............................................. B23P 15/26
[52] U.S. Cl. ........................................ 29/726; 29/822; 29/33 G; 29/33 K; 414/14; 414/28; 414/746
[58] Field of Search ................. 29/726, 727, 822, 823, 29/824, 33 G, 33 K; 414/14, 28, 43, 751, 752, 745, 746, 786

[56] References Cited

U.S. PATENT DOCUMENTS

| 2,065,586 | 12/1936 | Hoesel | 29/822 X |
| 3,468,009 | 9/1969 | Clausing | 29/727 X |
| 3,802,048 | 4/1974 | Schulenberg | 29/726 |
| 4,584,765 | 4/1986 | Gray | 29/727 |
| 4,625,378 | 12/1986 | Tanno | 29/727 |

Primary Examiner—Howard N. Goldberg
Assistant Examiner—Ronald S. Wallace
Attorney, Agent, or Firm—Antonelli, Terry & Wands

[57] ABSTRACT

An apparatus for producing various heat exchangers is disclosed in which a plurality of heat exchangers disposed side by side are formed at once. A series of manufacturing stations for working heat exchanger components such as fins and tubes and for opening the tubes are arranged in an endless manner to thereby automatically carry out the production steps with a high productivity while meeting various requirements of the specifications of the heat exchangers with a high flexibility.

3 Claims, 14 Drawing Figures

APPARATUS FOR ASSEMBLING FINS AND TUBES FOR HEAT EXCHANGERS

BACKGROUND OF THE INVENTION

1. Field of the Invention

The present invention relates to an apparatus for assembling fins and tubes for heat exchangers, and more particularly to an apparatus for automatically assembling a heat exchanger composed of a plurality of heat exchanger units.

2. Description of the Prior Art

In a conventional apparatus for automatically assembling a cross-fin tube type heat exchanger as shown in Japanese Patent Examined Publication No. 41817/1984, a number of fins are stacked on a fixture disposed on a rotary table, and tubes are automatically inserted into tube insertion holes formed in the fins while the rotary table is being rotated in an intermittent manner. According to this apparatus, it is possible to assemble heat exchangers of different types each having different fin lengths. Also, a fin manufacturing apparatus is known in which fins formed by a well known fin press machine are cut into a predetermined fin length while being sucked by suction plates, and thereafter, the fins are stacked one by one along stacking bars which serve to guide the fins to be stacked. There are many other well known machines such as a hair-pin bender and a tube opening device.

However, in any of these machines, it is necessary to manually supply the necessary number of heat exchanger components such as fins and tubes for machine working. Therefore, the works are not effective and many working persons are needed therefor. Although there are known some automatic working lines in series of fin formation, hair-pin bending, assembling and tube opening, it is impossible to deal with different type heat exchangers.

SUMMARY OF THE INVENTION

An object of the present invention is to provide an apparatus for producing various heat exchangers in which a plurality of heat exchangers disposed side by side are formed at once. A series of manufacturing stations for working heat exchanger components such as fins and tubes and for opening the tubes are arranged in an endless manner to thereby automatically carry out the production steps with a high productivity while meeting various requirements of the specifications of the heat exchangers with a high flexibility.

According to the present invention, there is provided an apparatus for assembling fins and tubes for heat exchangers, comprising in a continuous path: means for cutting a thin plate, having holes therein, into fins having a predetermined length; means for stacking the fins with the holes being penetrated by bars of a stacking unit; means for turning the stacking unit so as to keep the bars in a horizontal direction; means for inserting the tubes into the holes; means for removing the fins, into which the tubes have been inserted, apart from the stacking unit; and means for returning the stacking unit so as to keep the bars in a vertical direction, wherein the means for inserting the tubes comprises means for determining inserting angles of the tubes.

DESCRIPTION OF THE PREFERRED EMBODIMENTS

An embodiment of the present invention will now be described with reference to FIGS. 1 through 7.

Figure 1:
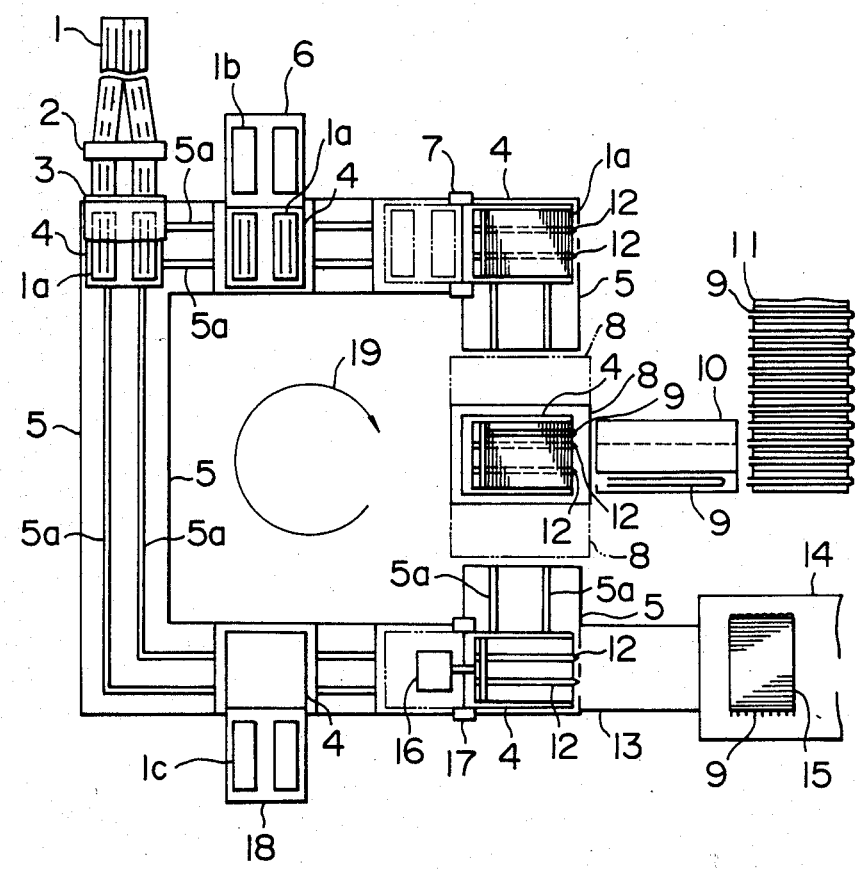
FIG. 1 is a plan view of a heat exchanger fin and tube assembling apparatus in accordance with the present invention.
Figure 2:
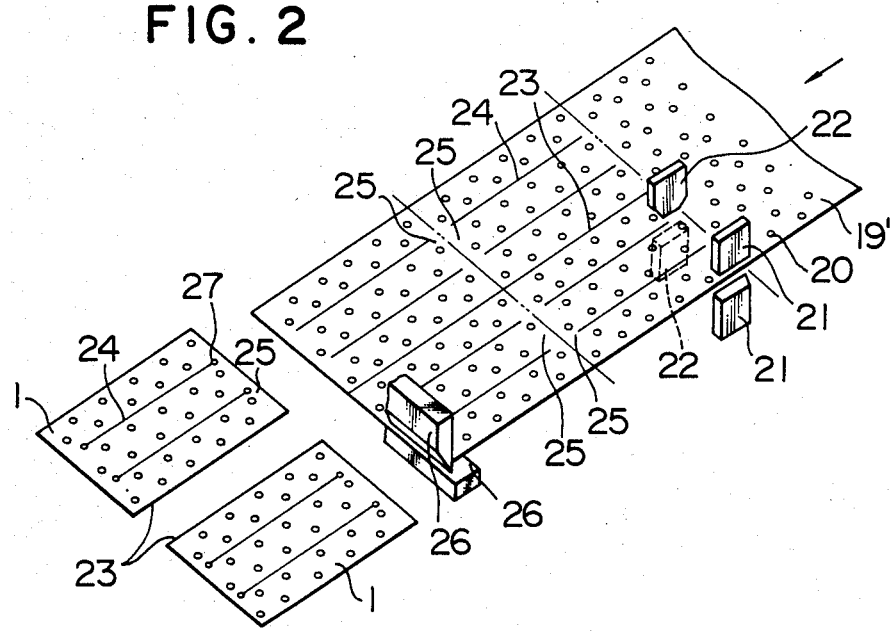
FIG. 2 is a perspective view illustrating the fin formation state.
Figure 3:
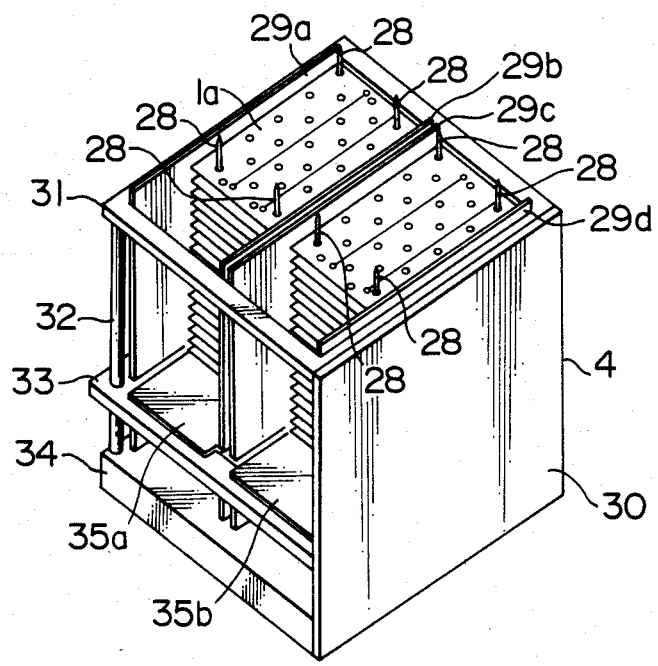
FIG. 3 is a perspective view of a stacking unit.
Figure 4:
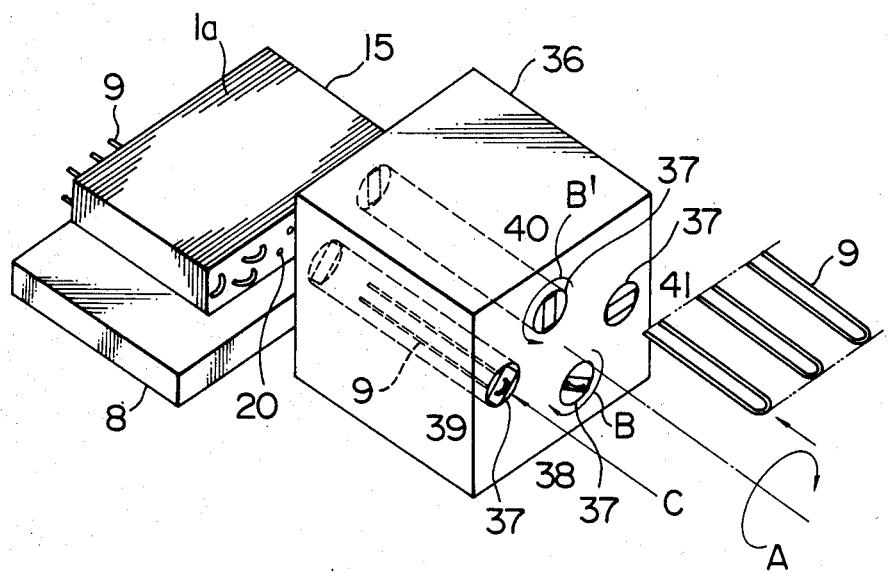
FIG. 4 is a perspective view of a tube insertion device.
Figure 5:
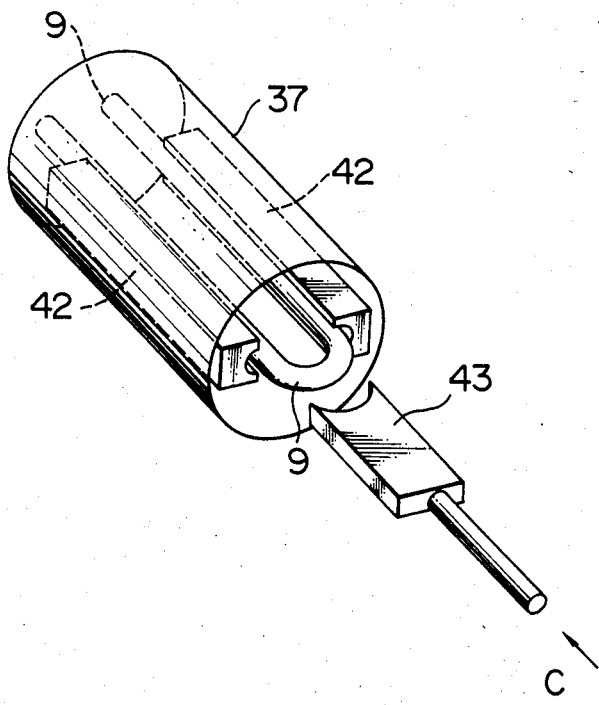
FIG. 5 is a perspective view of a horizontal head.
Figure 6:
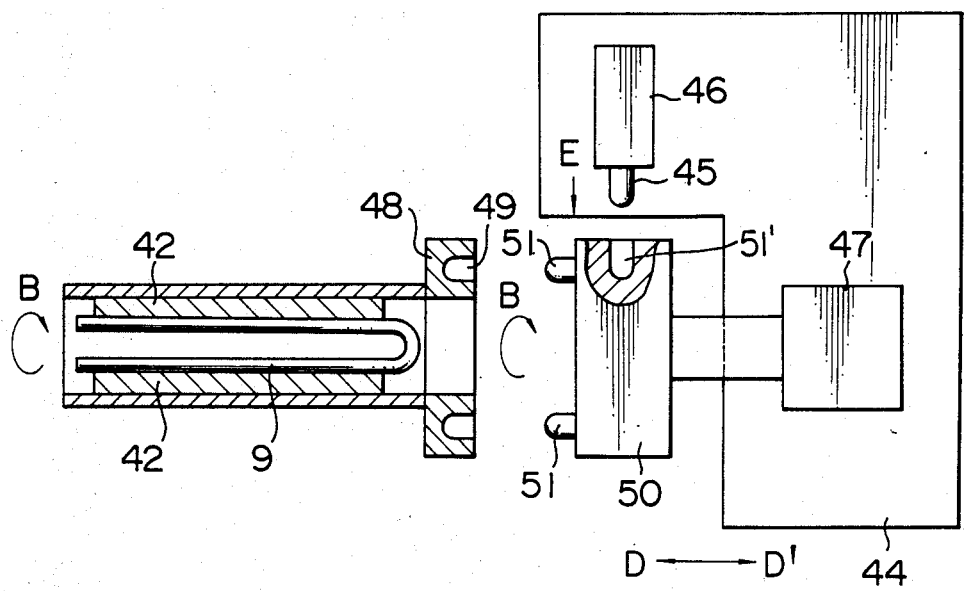
FIG. 6 is a view illustrating a method for determining the tube insertion angle.
Figure 7:
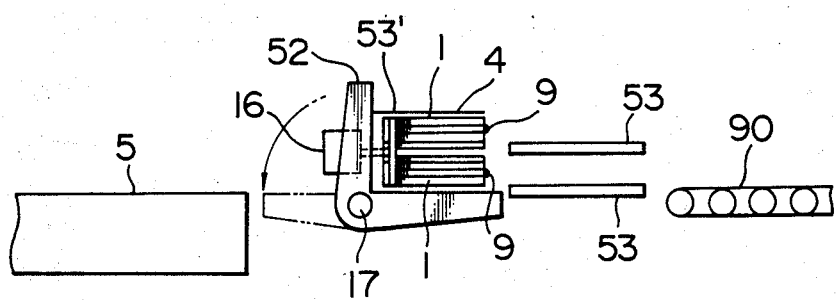
FIG. 7 is a view illustrating a method for discharging the workpiece.

FIG. 1 is a plan view of an apparatus for assembling fins and tubes for heat exchangers. FIG. 2 is a perspective view illustrating a state of a fin formation. FIG. 3 is a perspective view illustrating a stacking device. FIG. 4 is a perspective view showing a tube insertion device. FIG. 5 is a perspective view showing a horizontal head. FIG. 6 is a view illustrating a method of determining a tube insertion angle. FIG. 7 is a view illustrating a method of discharging workpieces.

In FIG. 1, reference numeral 1 denotes a group of fins in which holes are formed in advance. A cutting means 2 is adapted to cut the group of fins 1 into a predetermined length. A suction means 3 sucks fins 1a cut by the cutting means 2 so that stacking bars 12 disposed in a stacking unit 4 to be described later penetrates the holes of the fins perpendicularly to the fins. Stacking unit carrying rollers 5a are provided on delivery paths 5 of the stacking unit 4. A first side plate supply means 6 sets a first side plate 1b. A reversing or turning device 7 is adapted to reverse or turn the stacking unit 4 so that the stacking bars 12 are held in the horizontal direction. The reversing device 4 has the same structure as that of another reversing device 17 best shown in FIG. 7. The stacking unit 4 is loaded on an NC table 8. Hair-pin tubes or pipes 9 are inserted into the holes of the fins 1a set in the stacking unit 4 on the NC table 8 by an insertion device 10. The hair-pin tubes 9 are delivered to the insertion device 10 by a tube delivery conveyor 11. A plurality of stacking bars 12 are provided in each of the stacking units 4. The above-described fins 1a are stacked along the stacking bars 12. The fins 1a into which the hair-pin tubes 9 have been inserted are discharged from the stacking unit 4 and are aligned with each other by a workpiece aligning device 13 (the workpiece means the fins into which the tubes have been inserted). A heat exchanger 15 which is made by inserting the hair-pin tubes 9 into the fins 1a are delivered to a subsequent station by the workpiece delivery conveyor 14. The workpiece within the stacking unit 4 is pushed outside thereof by a workpiece discharge device 16 which is best shown in FIG. 7. The stacking unit 4 from which the workpiece has been discharged is reversed from a horizontal state to an upright state by the reversing or turning device 17. A second side plate 1c is set in a second side plate supply device 18. The delivery direction of the stacking unit is indicated by numeral 19.

According to the heat exchanger fin and tube assembling apparatus, the continuous fins 1 are cut and separated into fins 1a having a predetermined length by the cutting device 2, and thereafter, the fins 1a are stacked one by one within the stacking unit 4 while being sucked by the suction device 3. Then, the stacking unit 4 containing therein the predetermined number of fins is moved to the first side plate supply device 6 where the first side plate 1b is set in alignment with the tube insertion holes of the group of the fins 1. Thereafter, the stacking unit 4 is angularly rotated through an angle of 90 degrees by the reversing device 7 and is delivered to the delivery path 5 while being kept in a horizontal state. The stacking unit 4 is further moved to the NC table 8. After the stacking unit 4 has been positioned on the NC table 8, the hairpin tubes 9b which have been supplied through the tube delivery conveyor 11 are inserted into the tube insertion holes of the group of fins 1 by the tube insertion device 10.

The cutting device 2 for the fins 1a will be described in detail with reference to FIG. 2.

In FIG. 2, reference numeral 19' denotes a thin aluminum plate having a number of pipe or tube insertion holes 20. Reference numeral 21 denotes a pair of first widthwise cutting blades for cutting the thin aluminum plate 19'. Reference numeral 22 denotes a pair of second widthwise cutting blades for cutting the plates while uncut portions are left. The first and second widthwise cutting blades 21 and 22 are adapted to cut the thin aluminum plate 19' in a longitudinal direction so that the fins 1 have a predetermined width. Reference numeral 23 represents a continuous cutting line formed by the first widthwise cutting blades 21. Reference numeral 24 represents a discontinuous cutting line formed by the second widthwise cutting blades 22. Reference numeral 25 represents an uncut portion formed on the cutting direction of the discontinuous cutting line 24. The uncut portions 25 are to be cut in the subsequent process to thereby form heat exchangers. Reference numeral 26 denotes a pair of cutting blades for cutting the thin aluminum plate in the widthwise direction. By the cutting action of the cutting blades 26, the thin aluminum plate 19' is divided into groups of fins 1a separated along the continuous cutting line 23. Reference numeral 27 denotes small holes formed in the uncut portions 25 of the fins. The small holes 27 serve as guides when the uncut portions are cut in the subsequent process.

In order to deliver automatically the groups of the thus formed fins in stacks, it is necessary to provide a stacking unit for containing and delivering the fins 1a without any damage. The stacking unit 4 will be described in detail with reference to FIG. 3 in which the groups of fins 1a are loaded on the stacking unit 4. The desired number of stacking bars 28 are provided in accordance with a physical size of the fins 1a. An outer diameter of the stacking bars 28 is somewhat smaller than a diameter of the tube insertion holes 20 of the fins 1a but is larger than an outer diameter of the hair-pin tubes. The parts, corresponding to the continuous widthwise cutting line 23, of the stacked fins 1a are lightly pressingly supported by a plurality of fin pressing plates 29a, 29b, 29c and 29d. Reference numeral 30 denotes a side plate of the stacking unit 4, numeral 31 denotes a top frame of the stacking unit 4, numeral 32 denotes a main column, and numeral 33 denotes a movable frame that is movable while being guided along the main column 32. Numeral 34 denotes a base of the stacking unit 4, the stacking bars 28 extending from the base 34. Up-and-down moving plates 35a and 35b serve to carry thereon the group of fins 1a and to position the stacking bars 28 in place.

The insertion device 10 for inserting the tubes into the fins will now be described in detail with reference to FIGS. 4, 5 and 6.

FIG. 4 is a perspective view of the insertion device, FIG. 5 is a perspective view showing a horizontal head provided in the insertion device and FIG. 6 is a view illustrating the angle determining method.

Referring to FIG. 4, reference numeral 36 denotes a box-shaped drum that may be rotated in a direction indicated by the arrow A. A rotatable horizontal head 37 is provided in each part of the drum 1. An NC table 8 for positioning the tube insertion holes 20 of the fins 1a is adapted to control the position of the group of fins 1 in response to the arrangement of the hair-pin tubes 9. Reference numeral 41 denotes a tube reception step where the hair-pin tube 9 delivered by a conveyor or the like so that the direction of the hair-pin tube 9 is the same as the head 37 is inserted into the horizontal head 37. In order to insert the hair-pin tube 9 into the head 37, it is sufficient to lightly push the hair-pin tube 9 into the horizontal head 37. If the insertion of the hair-pin tube 9 is completed, then the drum 36 is turned through 90 degrees so that the angle determining step may be carried out. In the angle determining step 38, the horizontal head 37 is rotated in a direction indicated by the arrow B, so that the direction of the hair-pin tube 9 to be inserted into the fins 1 is determined. If the direction of the hair-pin tube 9 is determined, then the drum 36 is further turned through a right angle in order to carry out the tube insertion step 39. In the tube insertion step 39, the hair-pin tube 9 that has been received in the horizontal head 37 is pushed in a direction indicated by the arrow C, so that the hair-pin tube 9 is inserted into the tube insertion holes 20 of the fins 1 of the heat exchanger 15 loaded on the NC table 8. When the insertion of the hair-pin tube 9 is completed, finally, the drum is turned to the angle restoration step 40. In the angle restoration step 40, the angle of the horizontal head 37 is turned back to the angle of the first tube reception step 41 as indicated by the arrow B'. Thus, the four cyclic operations such as the tube reception, the tube angle determination, the tube insertion and the angle restoration may be continuously carried out in order.

It is apparent that in the foregoing embodiment the horizontal heads 37 are arranged in the box-shaped drum 36 but the shape of the drum may be modified if the horizontal heads 37 may be shifted or moved among the tube reception step 41, the angle determination step 38, the tube insertion step 39 and the angular position restoration step 40.

In FIG. 5, the horizontal head 37 is constructed so that tube support plates 42 for supporting the hair-pin tube 9 in place are provided in order to prevent the hair-pin tube 9 from falling apart therefrom, even if the head 37 is rotated so as to determine the angular position. In the pipe insertion step 39, an insertion claw 43 is used to push the hair-pin tube 9 in the direction indicated by the arrow C in FIG. 5, so that the hair-pin tube 9 may be inserted into the tube insertion holes 20 of the fins 1. This makes it easy to receive the hair-pin tube 9 and to determine the direction of the tube 9.

FIG. 6 shows an example of a method for determining the angle of the tube. On a base 44, there are mounted a drive means 46 for an angle determining pin 45 and a rotational drive means 47. A pair of coupling holes 49 are formed in a positioning plate 48 mounted on the horizontal head 37 so that they can be smoothly engaged with or disengaged from a pair of coupling pins 51 of an angle determining plate 50. Furthermore, an angle determining hole 51' is formed in the angle determining plate 50, so that the angle determining plate 50 may in turn be smoothly engaged with or disengaged from the angle determining pin 45. After the rotary drum 36 shown in FIG. 4 has been rotated through a right angle so that the horizontal head 37 receiving therein the hair-pin tube 9 is located in the angle determination step 38, the base 44 is moved in the direction indicated by the arrow D, and the coupling holes 49 of the angular position determining plate 48 are engaged with the associated coupling pins 51. Subsequently, the angle determining plate 50 is rotated in the direction indicated by the arrow B by the rotational drive means 47 that may be rotated at a low speed. When the angle determining plate 50 is rotated through a predetermined angle, the pin drive means 46 causes the angle determining pin 45 to project with the angle determining hole 51'. Finally, the base 44 is moved in the direction indicated by the arrow D'.

With such an angle determining method, three different angles, that is, a horizontal one, an angle of 60 degrees with respect to the horizontal line in the clockwise direction and an angle of 60 degrees with respect to the horizontal line in the counterclockwise direction may be determined for the respective tubes. This angle determining method is often very effective for a certain type heat exchanger in which the hair-pin tubes must be inserted into the fins in the horizontal direction, or at an angle of 60 degrees clockwise from the horizontal line, or at an angle of 60 degrees counterclockwise from the horizontal line, for example. For instance, the mounting angle of the hair-pin tubes must be changed in accordance with the temperature condition and performance condition in heat exchangers for use in room air-conditioners, dehumidifiers or the like.

Thus, according to the angle determining device shown in FIGS. 4 to 6, it is possible to select the angular positions the hair-pin tubes 9 received in the horizontal state as desired. Also, in the angle restoration step 40, the same system may be applied in order to return the angular position of the head to that corresponding to the tube reception step 41.

A method for discharging the groups of fins into which the hair-pin tubes have been inserted will be described with reference to FIG. 7.

FIG. 7 shows a method for discharging the workpiece of the heat exchanger in accordance with the present invention. In FIG. 7, from the NC table 8 that as been moved to the stacking unit removing position, the stacking unit 4 is delivered to the stacking unit reversing or turning device 7 through the stacking unit delivery path 5 and is located on a reversing or turning plate 52. Thereafter, a moving frame 53' is pressed by the rotation of the motor provided in the workpiece discharge device 17, so that the group of fins 1 (workpiece) is pushed apart from the stacking unit 4. The thus discharged fins are received by an alignment mechanism 53 and are delivered to a heat exchanger tube opening process through a delivery conveyor 90.

On the other hand, the stacking unit 4 from which the group of fins 1 have been removed is turned through a right angle back to the upright state by the returning device 16. Then, the stacking unit 4 is moved to the second side plate supply device 18 and the second side plate 1c is set along the stacking bars 28.

As described above, in the heat exchanger assembling apparatus according to the present invention, the stacking unit 4 is recirculated on the stacking unit delivery rollers 5a on the delivery path 5 as indicated by the arrow 19 in FIG. 1 to thereby automatically assemble the heat exchanger.

In view of a cost of the equipment, the side plate supply devices 6 and 18 may be dispensed with. The hair-pin tubes corresponding to the stacking bars 28 are inserted after the stacking unit has been removed.

According to the foregoing embodiment, since the stacking unit delivery path 5 is formed in the recirculation loop, the hair-pin tubes may be inserted automatically while the front and rear side plates 1b and 1c are being fixed within the stacking unit 4. This makes it easy to assemble the heat exchanger 15. Also, if the stacking unit recirculation loop is used, it is possible to connect in series the fin and tube assembling apparatus and the heat exchanger tube opening apparatus to each other, thereby providing an automatic series assembling system for heat exchangers.

Figure 8:
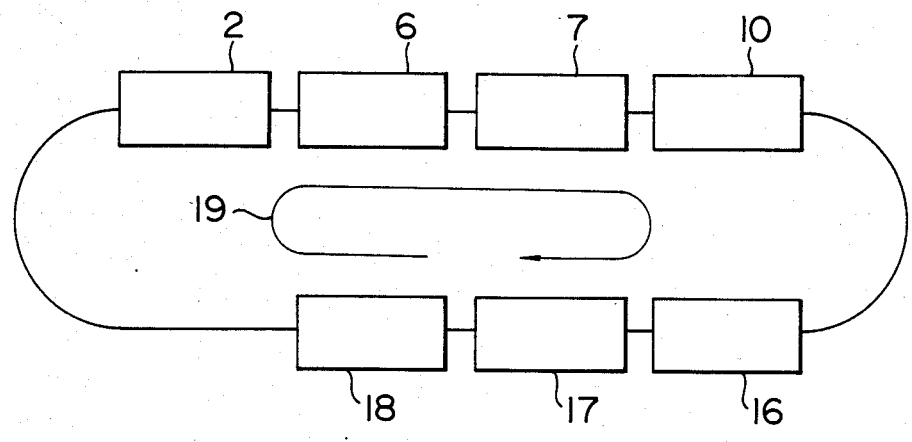
FIG. 8 is a block diagram illustrating the assembling steps in accordance with the present invention.

Such series assembling system for heat exchangers is shown in FIG. 8.

FIG. 8 is a block diagram showing the series process for the heat exchanger producing apparatus. As shown in FIG. 8, in the manufacturing apparatus according to the present invention, the stacking unit recirculation loop is composed of seven steps, that is, the fin supply step 2, the front side plate supply step 6, the stacking unit reversing step 7, the tube insertion step 10, the workpiece discharge step 16, the stacking unit returning-back step 17, and the rear side plate supply step 18. The stacking unit 4 is moved along the loop as indicated by the arrow 19.

The heat exchanger produced according to the heat exchanger manufacturing apparatus will be described with reference to FIGS. 9 and 10.

Figure 9:
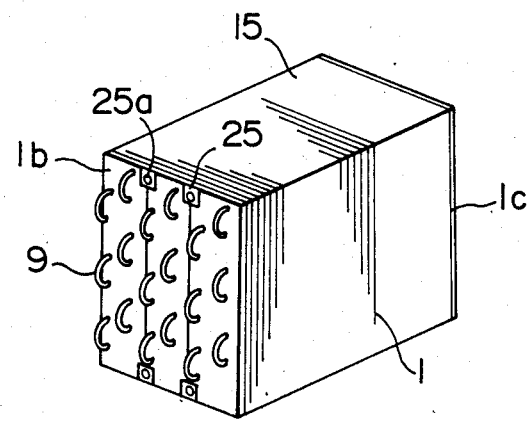
FIG. 9 is a perspective view of a heat exchanger produced in accordance with the assembling apparatus shown in FIG. 8.
Figure 10:
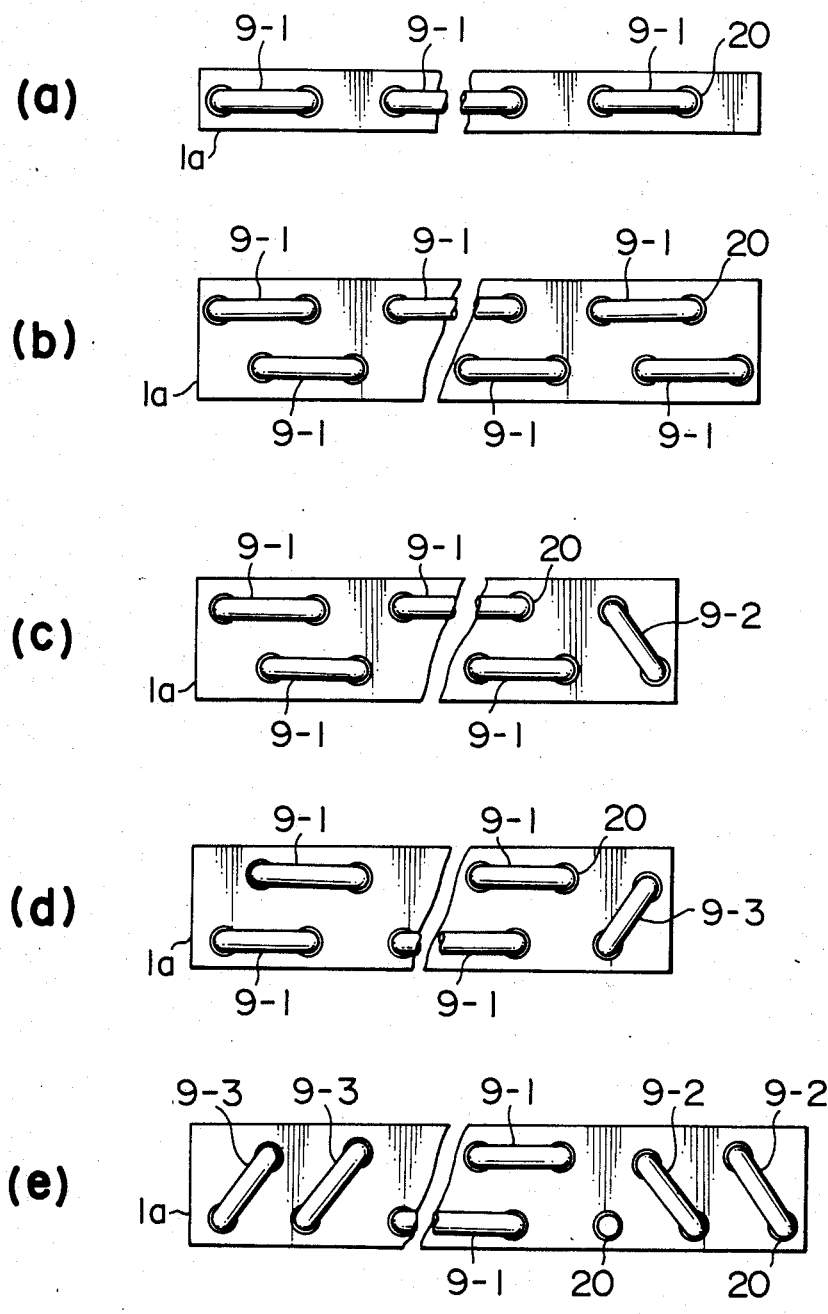
FIG. 10a-e is a series of side elevational views of the heat exchangers having different arrangements of tubes.

FIG. 9 is a perspective view of the heat exchanger produced according to the heat exchanger manufacturing apparatus and FIG. 10 is a series of views illustrating the difference of the tube arrangement in the heat exchanger.

In FIG. 9, reference numeral 15 denotes a workpiece, and numeral 25 denotes uncut portions in which small holes 25a are formed. Reference character 1b denotes a front side plate and reference character 1c denotes a rear side plate.

The workpiece 15 is cut at the uncut portions 25 by a cutter or the like, thus producing a plurality of heat exchangers. The small holes 25a are formed in the uncut portions 25 in order to absorb a possible displacement of the cutter to thereby ensure the cutting operation.

In FIG. 10, letters (a), (b), (c), (d) and (e) show various arrangements different in fin width, fin length and tube insertion angle. Reference numeral 9-1 denotes the hair-pin tubes inserted into the fins 1a in the horizontal direction, 9-2 denotes the hair-pin tubes inserted into the fins 1a at a slant angle of 60 degrees clockwise from the horizontal position, and 9-3 denotes the hair-pin tubes inserted into the fins 1a at a slant angle of 60 degrees counterclockwise from the horizontal position.

As is apparent from the foregoing explanation, the present invention may be applied to any heat exchanger having various hair-pin tube insertion angles.

We claim:

1. An apparatus for assembling fins and tubes for heat exchangers, comprising in a continuous path: means for cutting a thin plate, having holes therein, into fins having a predetermined length; means for stacking said fins with said holes being penetrated by bars of a stacking unit; means for turning said stacking unit so as to keep said bars in a horizontal direction; means for inserting the tubes into said holes; means for removing said fins, into which said tubes have been inserted, apart from said stacking unit; and means for returning said stacking unit so as to keep said bars in a vertical direction, wherein said means for inserting said tubes comprises means for determining inserting angles of said tubes.

2. An apparatus according to claim 1, wherein said means for inserting said tubes further comprises means for positioning said tubes at a position so as to face said fins, means for receiving said tubes, said receiving means being mounted on said inserting means, and means for pushing and inserting said tubes, held in said receiving means, into said holes of said fins.

3. An apparatus according to claim 2, wherein said means for inserting said tubes further comprising means for rotating said means for receiving said tubes, means for determining an angular position of said tubes, said angular position determining means being provided in said rotating means, and means for fixing an angular position of said tube pushing and inserting means in accordance with the angular position determined by said angular position determining means.

* * * * *